(12) United States Patent
Seo et al.

(10) Patent No.: US 12,537,570 B2
(45) Date of Patent: Jan. 27, 2026

(54) ELECTRONIC DEVICE FOR PERFORMING WIRELESS COMMUNICATION AND OPERATING METHOD THEREOF

(71) Applicant: SAMSUNG ELECTRONICS CO., LTD., Suwon-si (KR)

(72) Inventors: Jehwan Seo, Suwon-si (KR); Geunsam Yang, Suwon-si (KR); Sanggi Oh, Suwon-si (KR); Hyungyong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 375 days.

(21) Appl. No.: 18/114,514

(22) Filed: Feb. 27, 2023

(65) Prior Publication Data

US 2023/0254020 A1 Aug. 10, 2023

Related U.S. Application Data

(63) Continuation of application No. PCT/KR2022/021134, filed on Dec. 23, 2022.

(30) Foreign Application Priority Data

Feb. 7, 2022 (KR) .................. 10-2022-0015399

(51) Int. Cl.
*H04B 7/06* (2006.01)
*H02J 50/20* (2016.01)

(52) U.S. Cl.
CPC ............ *H04B 7/0602* (2013.01); *H02J 50/20* (2016.02)

(58) Field of Classification Search
CPC ................................ H04B 7/0602; H04B 7/00
See application file for complete search history.

(56) References Cited

U.S. PATENT DOCUMENTS

| 11,101,701 B2 | 8/2021 | Zeine et al. |
| 2017/0126278 A1 | 5/2017 | Shao et al. |

(Continued)

FOREIGN PATENT DOCUMENTS

| KR | 10-1767276 | 8/2017 |
| KR | 10-1968402 | 4/2019 |

(Continued)

OTHER PUBLICATIONS

Search Report dated Mar. 22, 2023 issued in International Patent Application No. PCT/KR2022/021134.

*Primary Examiner* — Ayodeji O Ayotunde
(74) *Attorney, Agent, or Firm* — NIXON & VANDERHYE P.C.

(57) ABSTRACT

An electronic device includes: a plurality of antenna elements, each including at least one antenna, configured for at least one operation of a wireless communication operation with a first external device and a wireless power transmission operation to a second external device, a memory including computer-executable instructions, a processor configured to execute the computer-executable instructions by accessing the memory, wherein when executed by the processor, the computer-executable instructions configure the electronic device to: determine whether a wireless power transmission function to the second external device is enabled based on the electronic device operating with power less than or equal to threshold power, and maintain wireless communication with the first external device through the plurality of antenna elements and transmit a signal for wireless power transmission to the second external device based on the wireless power transmission function being enabled.

20 Claims, 13 Drawing Sheets

(56) References Cited

U.S. PATENT DOCUMENTS

2017/0373725 A1* 12/2017 Lee .................... H02J 50/80
2019/0131827 A1*  5/2019 Johnston ............. H04B 5/79

FOREIGN PATENT DOCUMENTS

| KR | 10-2020-0094146 | 8/2020 |
| KR | 10-2020-0109503 | 9/2020 |
| KR | 10-2021-0058077 | 5/2021 |
| KR | 10-2021-0090050 | 7/2021 |
| KR | 10-2332621 | 12/2021 |
| KR | 10-2340017 | 12/2021 |

* cited by examiner

ELECTRONIC DEVICE FOR PERFORMING WIRELESS COMMUNICATION AND OPERATING METHOD THEREOF

CROSS-REFERENCE TO RELATED APPLICATIONS

This application is a continuation of International Application No. PCT/KR2022/021134 designating the United States, filed on Dec. 23, 2022, in the Korean Intellectual Property Receiving Office and claiming priority to Korean Patent Application No. 10-2022-0015399, filed on Feb. 7, 2022, in the Korean Intellectual Property Office, the disclosures of which are incorporated by reference herein in their entireties.

BACKGROUND

1. Field

The disclosure relates to an electronic device for performing wireless communication and an operating method thereof.

2. Description of Related Art

Wireless fidelity (Wi-Fi) is technology that enables electronic devices to connect to a wireless local area network (WLAN) and mainly uses a 2.4 GHz band and a 5 GHz band. Devices that use Wi-Fi technology include personal computers, game consoles, smartphones, digital cameras, tablet computers, and printers. Wi-Fi compatible devices may access the Internet through WLAN networks and wireless access points.

SUMMARY

Embodiments of the disclosure perform wireless power transmission to a remote control device while maintaining wireless communication with an access point when an electronic device operates in a low-power mode.

According to an example embodiment, an electronic device includes: a plurality of antenna elements each including at least one antenna configured for at least one operation of a wireless communication operation with a first external device and a wireless power transmission operation to a second external device, a memory including computer-executable instructions, and a processor configured to execute the computer-executable instructions by accessing the memory, wherein when executed by the processor, the computer-executable instructions configure the electronic device to: determine whether a wireless power transmission function to the second external device is enabled based on the electronic device operating with power less than or equal to threshold power, maintain wireless communication with the first external device through the plurality of antenna elements and transmit a signal for wireless power transmission to the second external device based on the wireless power transmission function being enabled.

According to an example embodiment, a method of operating an electronic device includes: determining whether a wireless power transmission function to a second external device is enabled based on the electronic device operating with power less than or equal to threshold power, and maintaining wireless communication with a first external device through a plurality of antenna elements and transmitting a signal for wireless power transmission to the second external device based on the wireless power transmission function being enabled.

According to various example embodiments, when an electronic device operates in a low-power mode, the electronic device may selectively perform a wireless power transmission to a remote control device while maintaining wireless communication with an access point.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
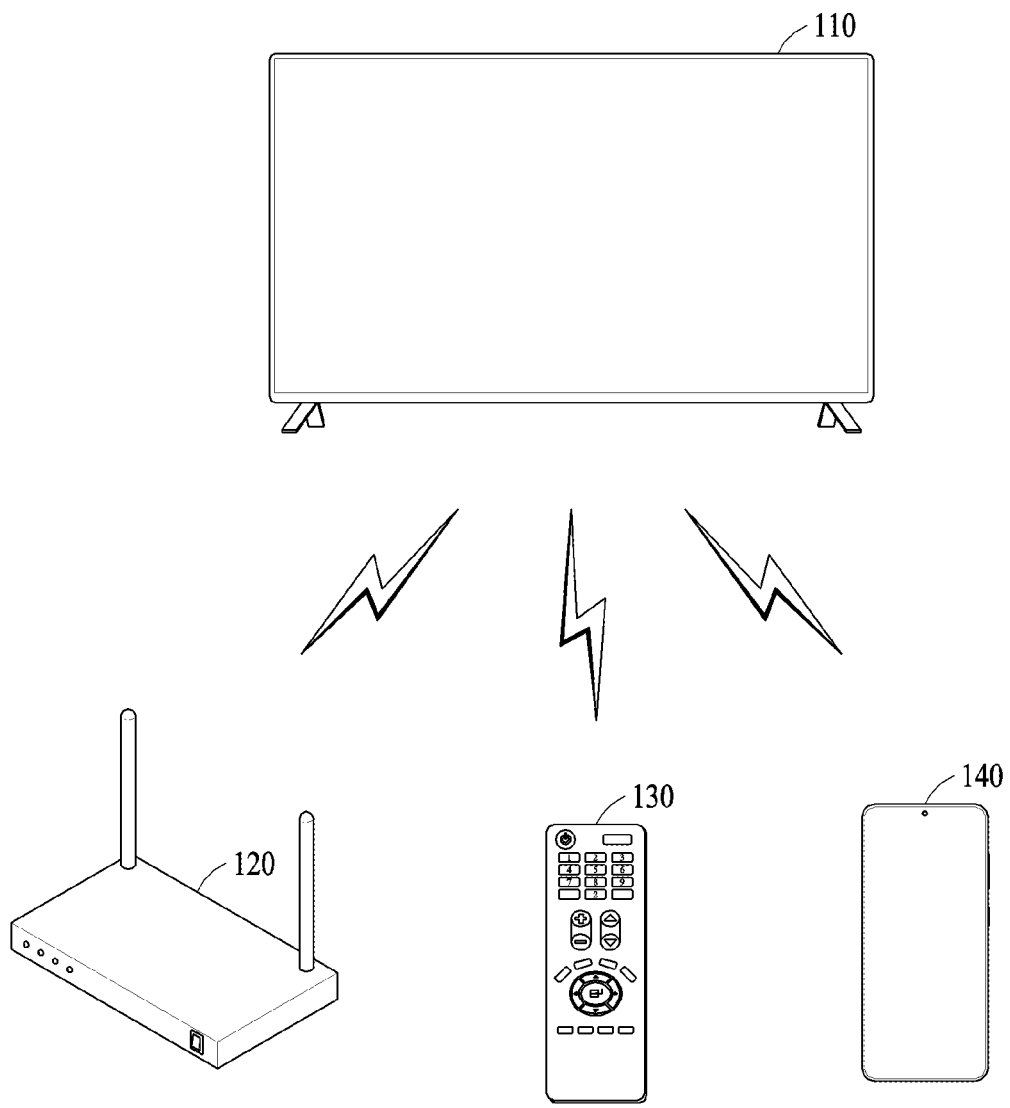
FIG. 1 is a diagram illustrating an overview of wireless communication system including an electronic device, a first external device, a second external device, and a third external device, according to various embodiments.

Hereinafter, various example embodiments will be described in greater detail with reference to the accompanying drawings. When describing the embodiments with reference to the accompanying drawings, like reference numerals refer to like elements and a repeated description related thereto may not be provided.

Although terms of "first" or "second" are used to explain various components, the components are not limited to the terms. These terms are used only to distinguish one component from another component. For example, a first component may be referred to as a second component, or similarly, the second component may be referred to as the first component within the scope of the present disclosure. The term "and/or" includes any one or any combination of the associated listed terms.

In example embodiments, the term "user" may refer, for example, to a person who controls a function or operation of an electronic device, or a person who controls a function or operation of a peripheral device. A user may include a manager or an installation engineer.

FIG. 1 is a diagram illustrating an overview of wireless communication system including an electronic device, a first external device, a second external device, and a third external device, according to various embodiments.

An electronic device 110 may be a device capable of performing wireless communication with an external device. For example, the electronic device 110 and the external device may be a television (TV), a smartphone, a tablet computer, a laptop computer, a desktop computer, an access point (AP), a remote control device, a set-top box, a home appliance, a personal digital assistant (PDA), or a wearable device, but are not limited thereto. Hereinafter, for the convenience of description, it will be illustrated, by way of non-limiting example that the electronic device 110 is a television, a first external device 120 is an access point (AP), the second external device 130 is a remote control device (e.g., a smart control).

The electronic device 110 may be connected to the first external device 120 to perform communication therewith. The first external device 120 may include an AP. The electronic device 110 may perform wireless communication (e.g., wireless fidelity (Wi-Fi) communication) with the first external device 120 in a first frequency band. For example, the first frequency band may include a 5 GHz band. The electronic device 110 may access the Internet through wireless communication provided by the first external device 120.

The electronic device 110 may perform wireless power transmission to a second external device 130. The second external device 130 may be a remote control device for controlling an operation and/or a function of the electronic device 110. The electronic device 110 may perform wireless power transmission to the second external device 130 in a second frequency band. For example, the second frequency band may include a 2.4 GHz band. The electronic device 110 may transmit a signal for wireless power transmission to the second external device 130.

Although FIG. 1 illustrates that the electronic device 110 performs wireless communication with the first external device 120 and wireless power transmission to the second external device 130 at the same time, the electronic device 110 may be in a state in which the wireless communication with the first external device 120 is performed and the wireless power transmission to the second external device 130 is not performed.

The electronic device 110 may determine whether to perform the wireless power transmission to the second external device 130. A processor (e.g., including processing circuitry) 210 (refer, e.g., to FIG. 2) may determine whether to perform the wireless power transmission to the second external device 130, based on a mode of the electronic device 110 and wireless power transmission flag.

The mode of the electronic device 110 may be an operation state of the electronic device 110. The mode of the electronic device 110 may include an operation mode and a low-power mode. The operation mode may be a state in which the electronic device 110 operates with power exceeding threshold power. The low-power mode may be a state in which the electronic device 110 operates with power less than or equal to the threshold power. For example, the electronic device 110 may be in the operation mode and operate with power exceeding the threshold power while a display of the electronic device 110 outputs an image. While a display of the electronic device 110 does not output an image, the electronic device 110 may operate with power equal to or less than threshold power and the television may be in the low-power mode. For reference, the mode of the electronic device 110 may be set based on a user input which controls (e.g., changes) the mode of the electronic device 110 received from the remote control device.

The processor may include various processing circuitry and determine the mode of the electronic device 110 according to whether the electronic device 110 operates with power exceeding the threshold power. For example, the processor may determine the mode of the electronic device 110 to be the operation mode when the electronic device 110 operates with power exceeding the threshold power. The processor may determine the mode of the electronic device 110 to be the low-power mode when the electronic device 110 operates with power less than or equal to the threshold power.

The wireless power transmission flag may be a flag which indicates whether the wireless power transmission function to the second external device 130 is enabled. The wireless power transmission function may be a function associated with the wireless power transmission operation of the electronic device to the second external device 130. When the wireless power transmission function is enabled, the electronic device may perform wireless power transmission while operating with power less than the threshold power, and when the wireless power transmission function is disabled, the electronic device may not perform the wireless power transmission even while operating with power less than the threshold power. As described in greater detail below, when the electronic device 110 receives an input ordering enabling or disabling the wireless power transmission function to the second external device 130, the electronic device 110 may store the wireless power transmission flag based on the received input.

The determining of whether the wireless power transmission to the second external device will be performed will be described in greater detail below with reference to FIG. 3.

The electronic device 110 may maintain wireless communication with the first external device 120 independently from whether wireless power transmission to the second external device 130 is performed. For example, the electronic device 110 may include a plurality of antenna elements for wireless communication. The electronic device 110 may allocate each of the plurality of antenna elements to one of the wireless communication operation with the first external device 120 and the wireless power transmission operation to the second external device 130. The electronic device 110 may perform wireless communication with the first external device 120 using an antenna element allocated to the wireless communication operation with the first external device 120 and may perform wireless power transmission to the second external device 130 using an antenna element allocated to the wireless power transmission operation to the second external device 130.

When the electronic device 110 performs wireless power transmission, the electronic device 110 may allocate a portion of the plurality of antenna elements to the wireless communication operation with the first external device 120 and may allocate another antenna element among the plurality of antenna elements to the wireless power transmission operation to the second external device 130. When the electronic device 110 does not perform wireless power transmission, the electronic device 110 may exclude the plurality of antenna elements from the allocation to the wireless power transmission operation to the second external device 130. For example, the electronic device 110 may allocate at least a portion of the plurality of antenna elements to the wireless communication operation with the first external device 120. The electronic device 110 may not allocate each of the plurality of antenna elements to the wireless power transmission operation to the second external device 130. As a result, regardless of whether the electronic device will perform wireless power transmission to the second external device 130, at least a portion of the plurality of antenna elements may be allocated to the wireless communication operation with the first external device 120. The electronic device may perform the wireless communication operation with the first external device 120.

However, the present disclosure is not limited thereto, and a portion of the antenna elements may not be allocated to the operation. For example, when wireless power transmission to the second external device 130 is not performed, a portion of the plurality of antenna elements may be allocated to the wireless communication operation with the first external device 120, and another antenna element may not be allocated to both the wireless communication operation with the first external device 120 and the wireless power transmission operation to the second external device 130. Another antenna element may not be used until the antenna element is allocated to the operation.

In the present disclosure, an example of the electronic device 110 including a plurality of antenna elements for wireless communication and/or a plurality of antenna elements for wireless power transmission is described, but the present disclosure is not limited thereto. The electronic device 110, separately from the wireless communication with the first external device, may further include an additional antenna element for a wireless communication operation with a third external device 140.

The electronic device 110 may perform communication with the third external device 140 by being connected to the third external device 140 through the additional antenna element. The third external device 140 may include, for example, a mobile terminal. The electronic device 110 may perform wireless communication (e.g., Bluetooth communication) with the third external device 140 in a third frequency band. For example, the third frequency band may include a 2.4 GHz band. The third external device 140 may transceive a file or data with the electronic device 110. For Bluetooth communication, a process of discovering a device capable of performing Bluetooth communication, requesting connection, and accepting connection may be performed. The second external device 130 and the third external device 140 are described as separate devices with reference to FIG. 1, but are not limited thereto, and may be implemented as a single device. For example, the second external device 130 may perform Bluetooth communication with the wireless power transmission operation described above. The second external device 130 may perform pointing control (e.g., a cursor movement) of the electronic device 110, based on Bluetooth communication.

The electronic device 110 may perform wireless communication and/or wireless power transmission with a plurality of devices through one or different frequency bands, as a device which supports wireless communication and wireless power transmission with the plurality of external devices. The electronic device 110 may perform wireless communication and/or wireless power transmission with the plurality of devices in a time division scheme or simultaneously. For example, the electronic device 110 may perform one of the wireless power transmission to the second external device 130 and the wireless communication with the third external device 140 while maintaining wireless communication with the first external device 120.

Figure 2:
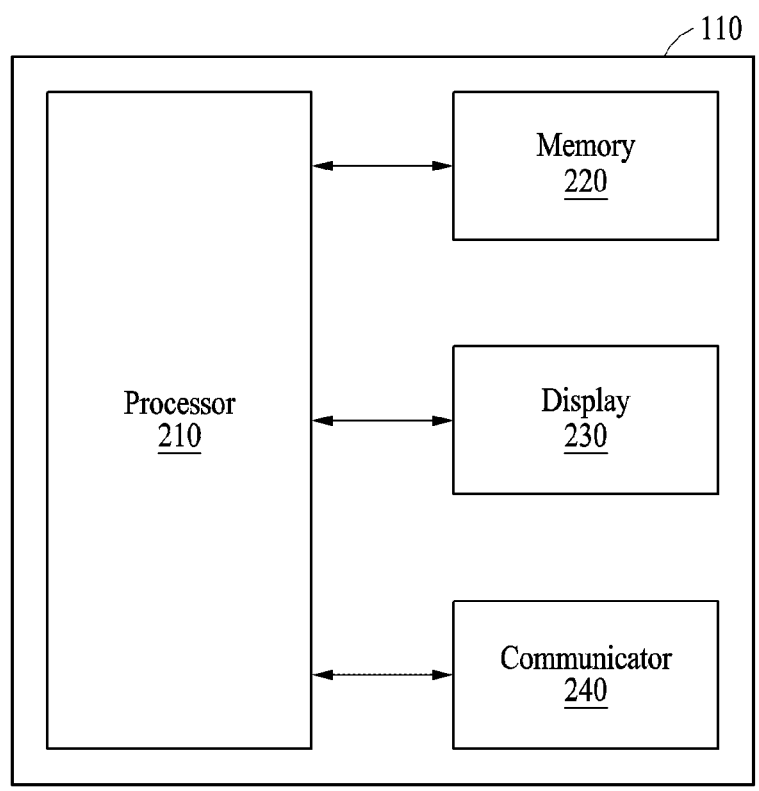
FIG. 2 is a block diagram illustrating an example configuration of an electronic device according to various embodiments.

FIG. 2 is a block diagram illustrating an example configuration of an electronic device according to various embodiments.

As illustrated in FIG. 2, the electronic device 110 according to an embodiment may include a processor (e.g., including processing circuitry) 210, a memory 220, a display 230, and a communicator (e.g., including communication circuitry) 240. However, not all components illustrated in FIG. 2 are essential components. The electronic device 110 may be implemented by more components than the illustrated components, and the electronic device 110 may be implemented by less components.

The processor 210 may include various processing circuitry and control overall operations of the electronic device 110 and a flow of a signal between internal components of the electronic device 110 and may process data. The processor 210 may execute various applications and an operation system (OS) stored in the memory 220, in response to a user input or when a preset and stored condition is satisfied.

The memory 220 may store various pieces of data, a program, and an application for driving and controlling the electronic device 110 under control by the processor 210, or may store at least one instruction executable by the processor 210. The memory 220 may store at least one of the signal and data input or output corresponding to the driving of the display 230 and the communicator 240.

The memory 220 may include at least one type of storage media of a flash memory type, a hard disk type, a multimedia card micro type, a card type memory (e.g., an SD or extreme digital (XE) memory), RAM, static RAM, ROM, electrically erasable programmable ROM (EEPROM), programmable ROM (PROM), a magnetic memory, a magnetic disk, and an optical disk.

The display 230 may display a video included in a broadcast signal received from the processor 210. In addition, the display 230 may display content (e.g., a moving image) input through the communicator 240. The display 230 may output an image stored in the memory 220 under control by the processor 210.

The communicator 240 may include various communication circuitry and connect the electronic device 110 with an external device (e.g., the first external device 120, the second external device 130, and/or the third external device 140 of FIG. 1) through the control of the processor 210. The processor 210 may transceive data with the external device connected through the communicator 240, download an application or perform web browsing through the external device. The communicator 240 may perform at least one of Wi-fi communication with the first external device, wireless power transmission to the second external device, and Bluetooth communication with the third external device.

In addition, the communicator 240 may receive a control signal of the remote control device (e.g., the second external device 130 of FIG. 1) under control of the processor 210. The control signal may be implemented as a Bluetooth type, a radio frequency (RF) signal type, or a Wi-Fi type. In addition, the communicator 240 may further include a module for another form of short-range communication (e.g., near field communication (NFC) and Bluetooth low energy (BLE)) other than the Bluetooth module.

In addition, the electronic device 110 may be implemented, for example, and without limitation, as an analog TV, a digital TV, a 3D-TV, a smart TV, an LED TV, an OLED TV, a plasma TV, and a monitor, however, one skilled in the art will understand that the examples are not limited thereto.

According to an embodiment, the electronic device 110 may perform wireless communication with the first external device, wireless power transmission to the second external device, and/or wireless communication with the third external device through the communicator 240. The communicator 240 may include a first antenna element (e.g., a first antenna element 424 of FIG. 4, a first antenna element 1023 of FIG. 10), a second antenna element (e.g., a second antenna element 426 of FIG. 4, a second antenna element 1025 of FIG. 10), or a third antenna element (e.g., a third antenna element 1029 of FIG. 10).

The first antenna element may be used for wireless communication between the electronic device 110 and the first external device. The second antenna element may be used for an operation of the wireless communication between the electronic device 110 and the first external device and the wireless power transmission from the electronic device 110 to the second external device. The third antenna element may be used for wireless communication between the electronic device 110 and a third external device. In the present disclosure, the first antenna element, the second antenna element, and the third antenna element are mainly described as one antenna element each, but are not limited thereto. For example, the first antenna element, the second antenna element, and the third antenna element may each include at least one antenna element.

The communicator 240 may perform communication with the first external device in the first frequency band and perform wireless power transmission to the second external device in the second frequency band. The first frequency band may be different from the second frequency band. The second frequency band may be a separate frequency band from the first frequency band. For example, the first frequency band may include a 5 GHz frequency band and the second frequency band may include a 2.4 GHz frequency band. The processor 210 may control the electronic device 110 to perform the wireless communication operation with the first external device in the first frequency band and the wireless power transmission operation to the second external device in the second frequency band simultaneously and/or in parallel. For example, the processor 210 may perform the wireless power transmission to the second external device in the second frequency band while maintaining the wireless communication with the first external device in the first frequency band.

The communicator 240 may selectively perform the wireless power transmission to the second external device while maintaining wireless communication with the first external device. For example, the communicator 240 may perform one of the wireless communication operation with the first external device and the wireless power transmission operation to the second external device using the second antenna element while maintaining the wireless communication with the first external device using the first antenna element. The processor 210 may select an operation to perform through the second antenna element of the communicator 240. Selection of an operation using the second antenna element is described in greater detail below with reference to FIG. 3.

The electronic device 110 may perform wireless communication with the third external device using the third antenna element of the communicator 240. The communicator 240 may perform wireless communication with the third external device in the third frequency band. At least a portion of the third frequency band may overlap the second frequency band for wireless power transmission to the second external device. For example, the second frequency band and the third frequency band may include the 2.4 GHz frequency band. The processor 210 may perform the wireless power transmission operation to the second external device in the second frequency band and wireless communication operation with the third external device in the third frequency band in the time division scheme. For example, the processor 210 may perform wireless power transmission to the second external device in the second frequency band during a portion of the communication period and may perform communication with the third external device in the third frequency band during another portion of the communication period.

Figure 3:
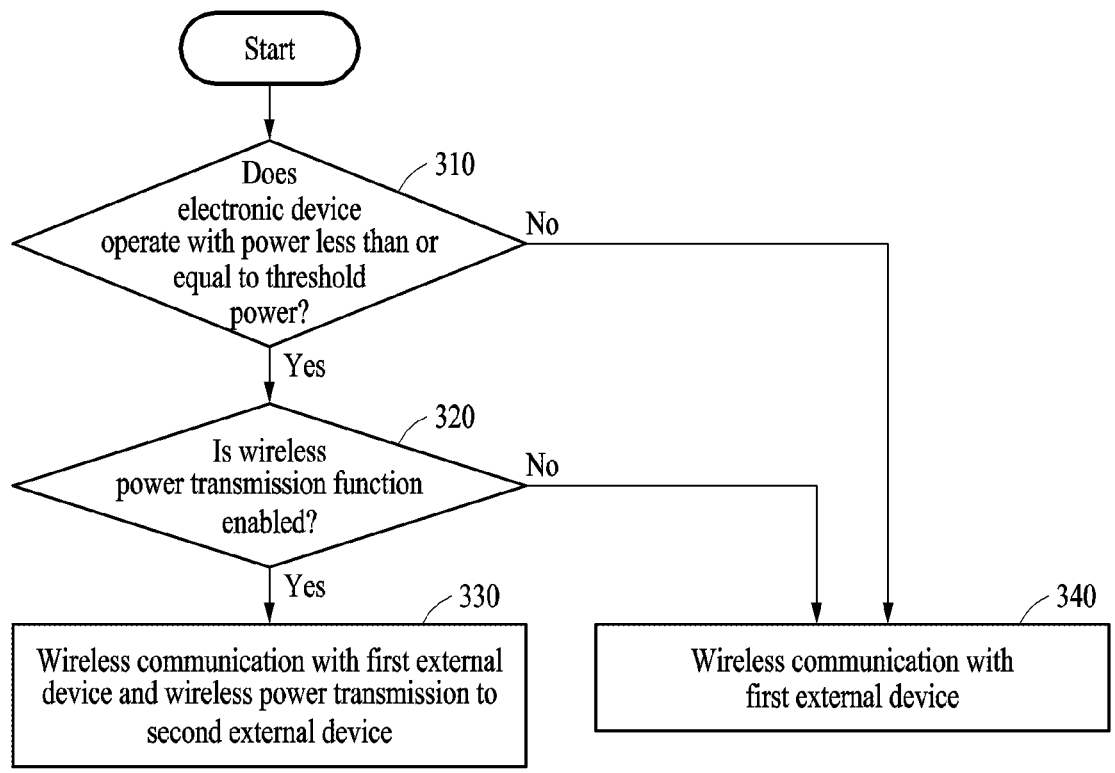
FIG. 3 is a flowchart illustrating an example method of operating an electronic device according to various embodiments.

FIG. 3 is a flowchart illustrating an example method of operating an electronic device according to various embodiments.

In the following example embodiments, operations may be performed sequentially, but not necessarily limited thereto. For example, the order of the operations may change, and the operations may be performed in parallel. Operations 310 to 340 may be performed by at least one component of the electronic device (e.g., the electronic device 110 of FIG. 2).

In operation 310, the processor may determine whether the electronic device operates with power less than or equal to the threshold power. As described hereafter, the processor may determine whether to perform the wireless power transmission to the second external device when the electronic device operates (e.g., the electronic device operates in the low-power mode) with power less than or equal to the threshold power. The processor may perform wireless communication with the first external device when the electronic device operates (e.g., the electronic device operates in the operation mode) with power exceeding the threshold power.

In operation 320, the processor may determine whether the wireless power transmission function to the second external device is enabled when the electronic device operates with power less than or equal to the threshold power (YES in operation 310). The processor may determine whether the wireless power transmission function to the second external device is enabled based on the wireless power transmission flag. For example, the processor may determine that the wireless power transmission function is enabled when the wireless power transmission flag is enabled. The processor may determine that the wireless power transmission function is disabled when the wireless power transmission flag is disabled.

The wireless power transmission flag may refer to a flag which indicates whether the wireless power transmission function from the processor to the second external device is enabled and may be stored based on an input received from the user. The processor, when an input is received from the user which indicates whether the wireless power transmission function to the second external device will be enabled, may store the wireless power transmission flag based on the received input. For example, the processor may store the wireless power transmission flag as enabled when an input is received from the user, ordering the enabling of the wireless power transmission function. In another example, the processor may store the wireless power transmission flag as disabled when an input is received from the user, ordering the disabling of the wireless power transmission function.

In operation 330, the processor may perform the wireless communication with the first external device and the wireless power transmission to the second external device, when the electronic device operates with power less than or equal to the threshold power and the wireless power transmission function to the second external device is enabled (YES in both operations 310 and 320).

In operation 340, the processor may perform wireless communication with the first external device when the electronic device operates with power less than or equal to the threshold power and the wireless power transmission function to the second external device is disabled (NO in operation 320). For example, the processor may exclude the wireless power transmission to the second external device and perform the wireless communication with the first external device when it is determined that the electronic device operates with power less than or equal to the threshold power in operation 310 and that the wireless power transmission function to the second external device is disabled in operation 320.

In operation 340, the processor may perform wireless communication with the first external device when the electronic device operates with power exceeding the threshold power (NO in operation 310). The processor may exclude the plurality of antenna elements from the allocation to the wireless power transmission operation when the electronic device operates with power exceeding the threshold power. The processor may exclude the electronic device which operates with power exceeding the threshold power from wireless power transmission to the second external device and perform wireless communication with the electronic device and the first external device. The processor may maintain wireless communication with the first external device through at least a portion of the plurality of antenna elements, independently from whether the wireless power transmission function is enabled.

Figure 4:
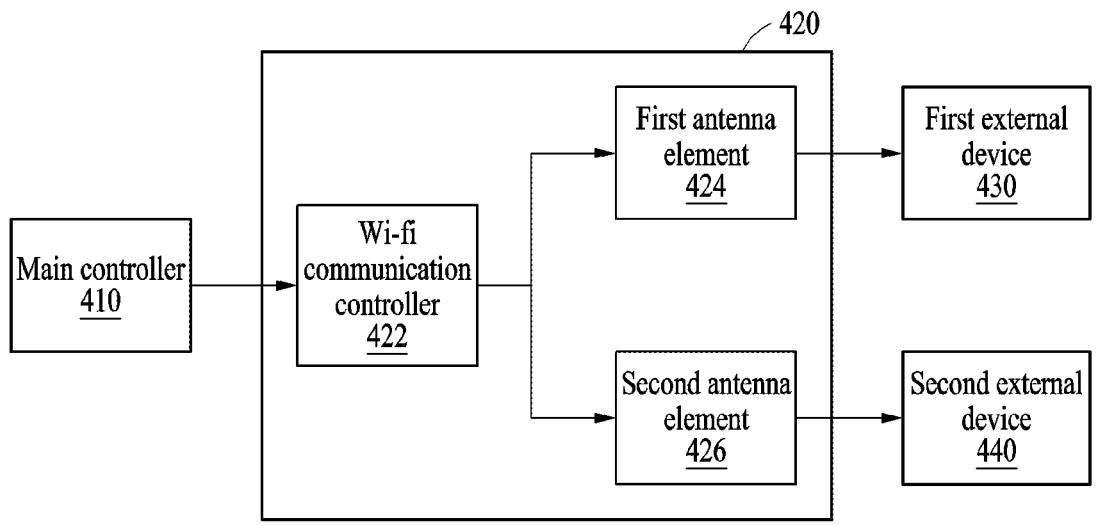
FIG. 4 is a block diagram of illustrating an example configuration of a communicator of an electronic device according to various embodiments.

FIG. 4 is a block diagram illustrating an example configuration of a communicator of an electronic device according to various embodiments.

A main controller (e.g., including processing circuitry) 410 (e.g., the processor 210 of FIG. 2) of the electronic device (e.g., the electronic device 110 of FIG. 2) may control the operation of a communicator 420 of the electronic device. For example, the main controller 410 may control the electronic device to perform at least one of wireless communication with a first external device 430 and wireless power transmission to the second external device 440 through the communicator 420. As described as an example in FIG. 3 above, the main controller 410 may exclude the plurality of antenna elements from the wireless power transmission to the second external device 440 and may perform the wireless communication with the first external device 430 through the plurality of antenna elements. In another example, the main controller 410 may perform wireless communication with the first external device 430 and wireless power transmission to the second external device 440 at the same time through the plurality of antenna elements.

The communicator 420 may include a Wi-fi communication controller (e.g., including processing and/or control circuitry) 422 and a plurality of antenna elements (e.g., the first antenna element 424 and the second antenna element 426, each including, e.g., at least one antenna).

The Wi-Fi communication controller 422 may include various processing and/or control circuitry and cooperate with the main controller 410 to perform wireless communication and/or wireless power transmission. The Wi-fi communication controller 422 may set and operate the plurality of antenna elements for wireless communication and/or wireless power transmission.

The plurality of antenna elements may include an antenna element designed for at least one of the wireless communication operation with the first external device and the wireless power transmission operation to the second external device. For example, the plurality of antenna elements may include the first antenna element 424 and the second antenna element 426. The first antenna element 424 may be an antenna element for wireless communication. The second antenna element 426 may be an antenna element for wireless communication and/or wireless power transmission. The second antenna element 426 may selectively perform one of the wireless communication and the wireless power transmission according to control by the Wi-fi communication controller 422 and/or the main controller 410. For example, the second antenna element 426 may be set by the Wi-fi communication controller 422 described above to transceive a signal for wireless communication or a signal for wireless power transmission.

The communicator 420 may perform the wireless communication with the first external device 430 and the wireless power transmission to the second external device 440 at the same time. The communicator 420 may perform the wireless communication with the first external device 430 and the wireless power transmission to the second external device 440 at the same time in different frequency bands. For example, the communicator 420 may perform wireless communication with the first external device 430 in the first frequency band and may perform wireless power transmission to the second external device 440 in the second frequency band that is different from the first frequency band.

Although FIG. 4 illustrates the communicator 420 performing wireless communication with the first external device 430 through the first antenna element 424 and performing wireless power transmission to the second external device 440 through the second antenna element 426, the present disclosure is not limited thereto. The communicator 420 may be connected to the first external device 430 through both the first antenna element 424 and the second antenna element 426.

The communicator 420 may exclude the wireless power transmission to the second external device 440 and perform the wireless communication with the first external device 430. For example, the communicator 420 may perform wireless communication with the first external device 430 through the first antenna element 424 and the second antenna element 426.

Figure 5:
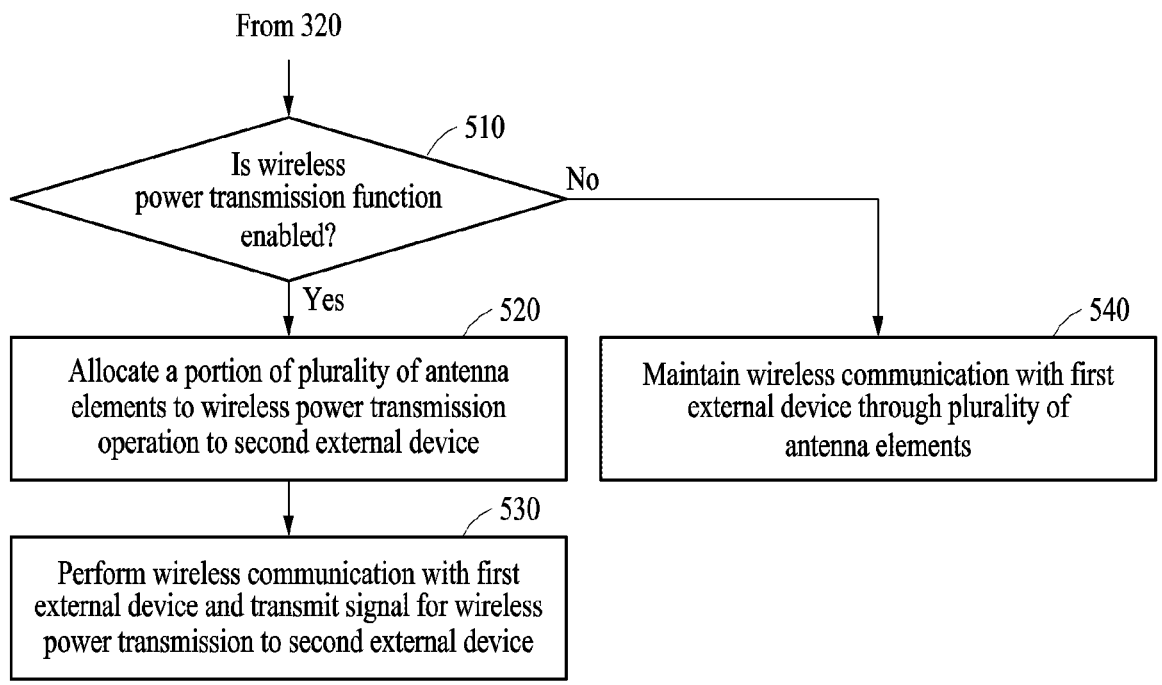
FIG. 5 is a flowchart illustrating an example method of operating an electronic device when operation power of the electronic device changes from power exceeding threshold power to power less than or equal to the threshold power according to various embodiments.
Figure 6A:
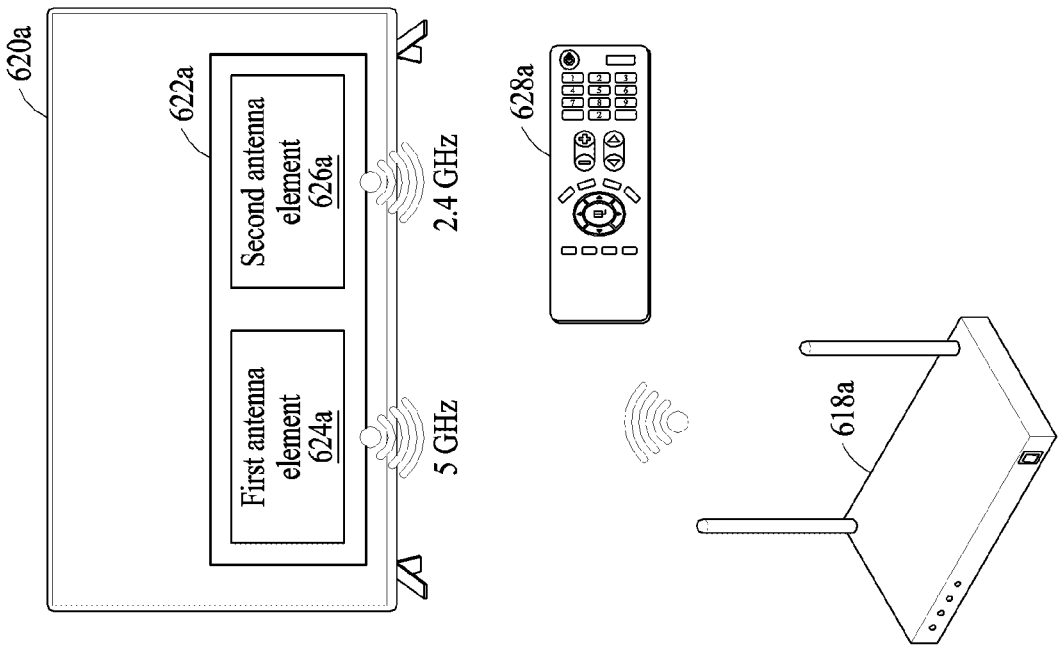
FIGS. 6A and 6B are diagrams illustrating an example operation according to whether a wireless power transmission function is enabled when operation power of an electronic device changes from power exceeding threshold power to power less than or equal to threshold power according to various embodiments.
Figure 6A:
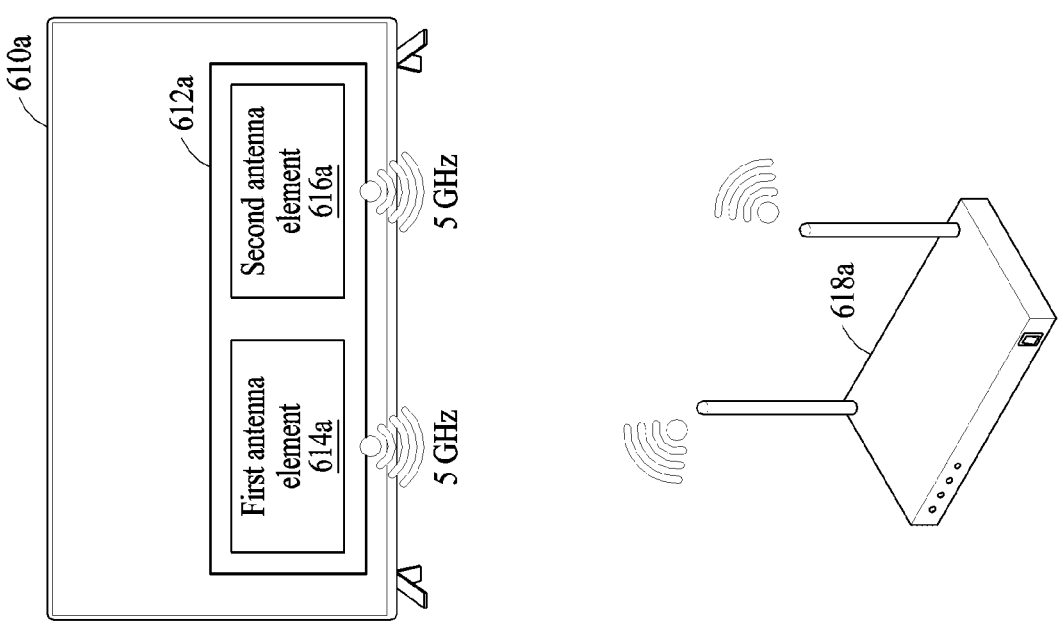
Figure 6B:
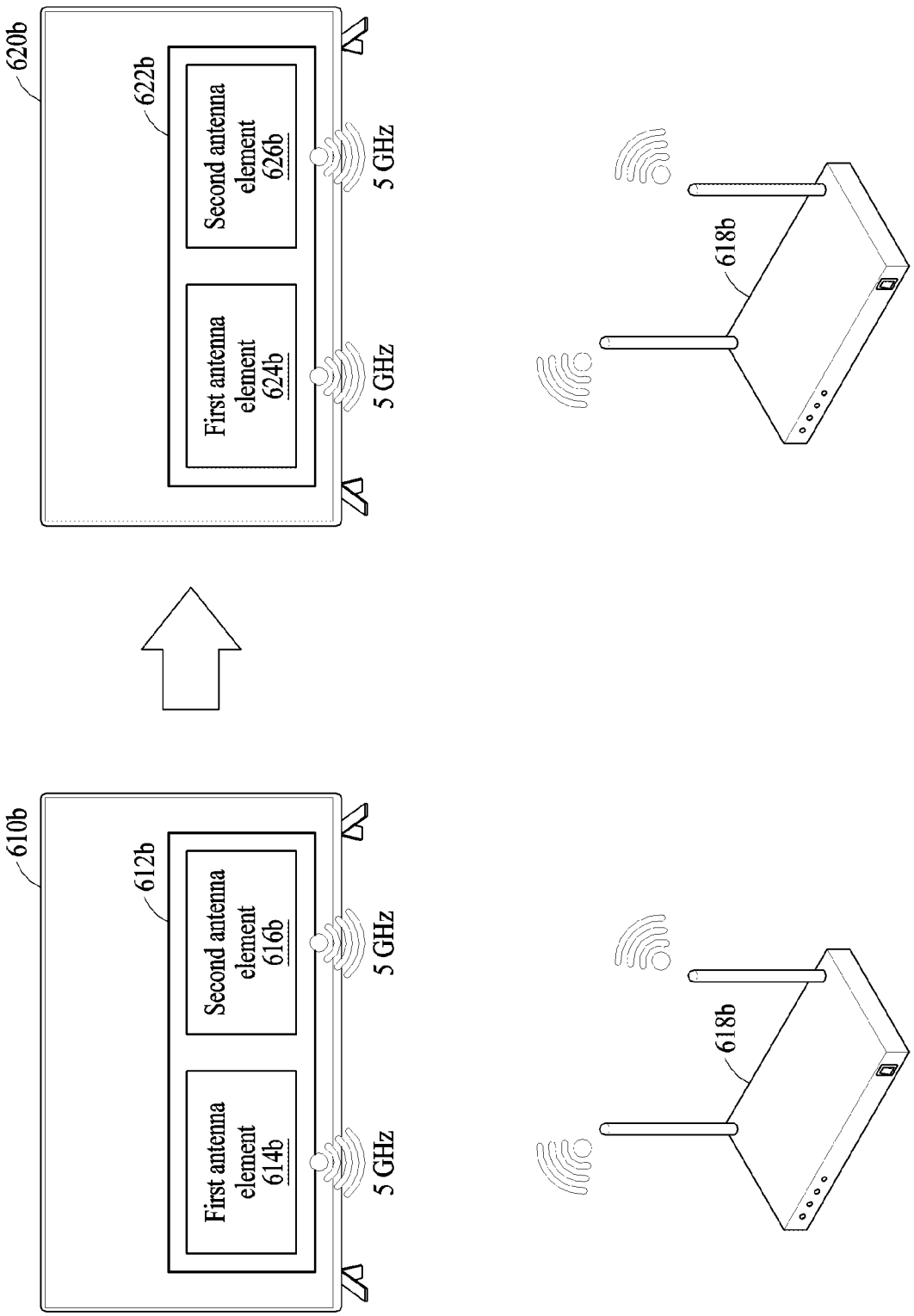

FIG. 5 is a flowchart illustrating an example method of operating an electronic device when operation power of the electronic device changes from power exceeding threshold power to power less than or equal to the threshold power according to various embodiments. FIGS. 6A and 6B are diagrams illustrating example operations according to whether a wireless power transmission function is enabled when operation power of an electronic device changes from power exceeding threshold power to power less than or equal to threshold power according to various embodiments.

The electronic device according to an embodiment may allocate the plurality of antenna elements to the wireless communication operation with the first external device (e.g., a first external device 618a of FIG. 6A or a first external device 618b of FIG. 6B) while the electronic device operates with power exceeding the threshold power like an electronic device 610a of FIG. 6A and an electronic device 610b of FIG. 6B.

In operation 510, the processor may determine whether the wireless power transmission function to the second external device is enabled when the electronic device operates with power less than or equal to the threshold power. The processor may determine whether the wireless power transmission function is enabled when the operating power of the electronic device changes from the power exceeding the threshold power to the power less than or equal to the threshold power. The processor may determine whether the wireless power transmission function is enabled based on the wireless power transmission flag.

In operation 520, the processor may allocate a portion of the plurality of antenna elements to the wireless power transmission operation to the second external device (YES in operation 510). For example, the processor may allocate, to the wireless power transmission operation to the second external device, a portion of the antenna elements allocated to the wireless communication operation with the first external device. The processor may maintain the allocation of the rest of the antenna elements among the allocated antenna elements to the wireless communication operation with the first external device. The processor may maintain wireless communication with the first external device through the remaining antenna elements and may perform wireless power transmission to the second external device through a portion of antenna elements.

In operation 530, the processor may perform the wireless communication with the first external device and the wireless power transmission to the second external device. The processor may perform the wireless communication with the first external device and the wireless power transmission to the second external device at the same time in different frequency bands. The processor may perform wireless communication with the first external device in the first frequency band and transmit a signal for wireless power transmission to the first external device in the second frequency band. The first frequency band may be separated from the second frequency band. For example, the first frequency band may include a 5 GHz band and the second frequency band may include a 2.4 GHz band.

As described above, in operations 520 and 530, the processor may maintain the wireless communication with the first external device and transmit the signal for the wireless power transmission to the second external device through the plurality of antenna elements when the wireless power transmission function is enabled. The electronic device may also not disconnect the wireless communication with the first external device and perform the wireless power transmission to the second external device at the same time while the wireless power transmission function is enabled.

In operation 540, the processor may maintain the wireless communication with the first external device when the wireless power transmission function is disabled (NO in operation 510). The processor may exclude the plurality of antenna elements from the allocation to the wireless power transmission operation when the wireless power transmission function is disabled. The processor may continuously allocate the plurality of antenna elements to the wireless communication operation when the wireless power transmission function is disabled. For example, not all of the plurality of antenna elements may be allocated to the wireless power transmission operation.

Hereinafter, an operation of the electronic device in which the wireless power transmission function is enabled when the operation power of the electronic device changes from power exceeding the threshold power to power less than or equal to the threshold power is described in greater detail with reference to FIG. 6A.

As shown in FIG. 6A, a first antenna element 614a and a second antenna element 616a of the electronic device 610a may be allocated to the wireless communication operation with the first external device 618a while the electronic device 610a operates with power exceeding the threshold power. The electronic device 610a may perform wireless communication with the first external device 618a through a first antenna element 614a and the second antenna element 616a while the electronic device 610a operates with power exceeding the threshold power.

The processor may determine whether the wireless power transmission function to the second external device 628a is enabled when the electronic device 620a operates with power less than or equal to the threshold power. In FIG. 6A, the electronic device 620a may determine that the wireless power transmission function is enabled.

The processor may allocate a portion (e.g., the second antenna element 626a) of the antenna elements 624a and 626a allocated to the wireless communication operation with the first external device 618a to the wireless power transmission operation to the second external device 628a when the wireless power transmission function to the second external device 628a is enabled. The processor may change an operation using the second antenna element 626a from a wireless communication operation with the first external device 618a to a wireless power transmission operation to the second external device 628a.

The processor may perform wireless communication with the first external device 618a through the first antenna element 624a and may transmit a signal for wireless power transmission to the second external device 628a through the second antenna element 626a while the electronic device 620a operates with power less than or equal to the threshold power.

Even though the operation power of an electronic device changes, the processor may maintain wireless communication with the first external device 618a through the first antenna element.

Hereinafter, an operation of an electronic device in which the wireless power transmission function is disabled when the operation power of the electronic device changes from power exceeding the threshold power to power less than or equal to the threshold power is described in greater detail with reference to FIG. 6B.

As shown in FIG. 6B, the first antenna element 614b and the second antenna element 616b may be allocated to the wireless communication with the first external device 618b while the electronic device 610b operates with power exceeding the threshold power. The electronic device 610b may perform wireless communication with the first external device 618b through the first antenna element 614b and the second antenna element 616b while the electronic device 610b operates with power exceeding the threshold power.

The processor may determine whether the wireless power transmission function to the second external device is enabled when the electronic device 620b operates with power less than or equal to the threshold power. In FIG. 6B, the electronic device 620*b* may determine that the wireless power transmission function is disabled.

The processor may exclude antenna elements 624*b* and 626*b* from allocation to the wireless power transmission operation to the second external device when the wireless power transmission function to the second external device is disabled. The processor may maintain the allocation of the antenna elements 624*b* and 626*b* to the wireless communication with the first external device 618*b*. The processor may perform wireless communication with the first external device 618*b* through the first antenna element 624*b* and the second antenna element 626*b* while the electronic device 620*b* operates with power less than or equal to the threshold power.

The processor may maintain the wireless communication with the first external device 618*b* through the first antenna element and the second antenna element even if the operation power of the electronic device changes.

Figure 7:
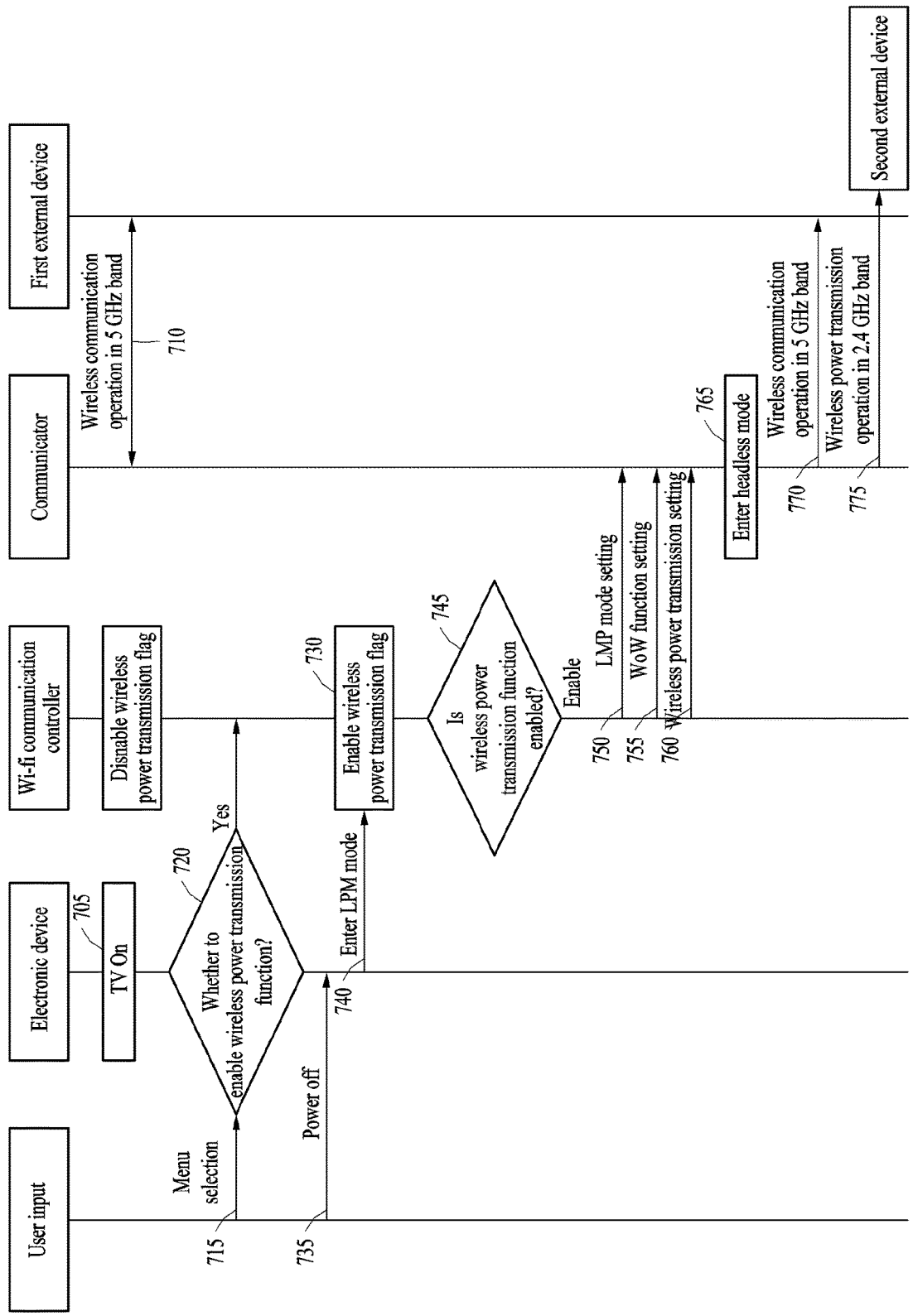
FIG. 7 is a signal flow diagram illustrating an example operation of an electronic device when performing wireless communication with a first external device and wireless power transmission to a second external device according to various embodiments.

FIG. 7 is a signal flow diagram illustrating an example operation of an electronic device when performing wireless communication with a first external device and wireless power transmission to a second external device according to various embodiments.

An example operation of the electronic device according to an embodiment is described with reference to FIG. 7. In FIG. 7, the electronic device may operate in an operation mode and the wireless power transmission flag may be set as disabled. The electronic device may receive a first user input which orders an enabling of the wireless power transmission function and may receive a second user input which orders a turning off of the electronic device afterwards.

In operation 705, the electronic device (e.g., the electronic device 110 of FIG. 1) may operate in the operation mode. As described above, a state of the electronic device being turned on (e.g., TV on) and the display of the electronic device outputting an image may be referred to as an operation mode.

In operation 710, the electronic device may perform wireless communication with the first external device through the first antenna element and the second antenna element of the communicator while operating in the operation mode. For example, the electronic device may perform wireless communication with the first external device in a 5 GHz frequency band through the first antenna element and the second antenna element of the communicator while operating in the operation mode.

In operation 715, the electronic device may receive the first user input which orders whether to enable the wireless power transmission function to the second external device.

In operation 720, the electronic device may determine whether to enable the wireless power transmission function based on the first user input. For example, the electronic device may determine that the wireless power transmission function is enabled when a first user input which orders the enabling of the wireless power transmission function is received.

In operation 730, the Wi-fi communication controller may store the wireless power transmission flag based on whether the wireless power transmission function is enabled. For example, the Wi-fi communication controller may store the wireless power transmission flag as enabled when the wireless power transmission function is enabled. For example, the Wi-fi communication controller may store the wireless power transmission flag by changing the setting of the wireless power transmission flag from disabled to enabled.

In operation 735, the electronic device may receive the second user input which orders the turning off of the electronic device. In operation 740, the electronic device may enter the low-power mode when the second user input is received. In operation 745, the Wi-fi communication controller (e.g., the Wi-fi communication controller 422 of FIG. 4) may determine whether the wireless power transmission function to the second external device is enabled based on the stored wireless power transmission flag when the electronic device enters the low-power mode. For example, the Wi-fi communication controller may determine that the wireless power transmission function to the second external device is enabled when the wireless power transmission flag is enabled. The Wi-fi communication controller may initiate wireless power transmission which is described hereafter, based on the wireless power transmission function to the second external device being enabled.

In operations 750, 755, and 760, the Wi-fi communication controller may perform setting of the communicator. In operation 750, the Wi-fi communication controller may set the communicator in a low-power mode. In operation 755, the Wi-Fi communication controller may set the controller with a wake on Wake on WLAN function (WOW) function. In operation 760, the Wi-fi communication controller may set the controller with the wireless power transmission to the second external device.

In operation 765, the controller may enter a headless mode. The headless mode may refer, for example, to a state in which the display (e.g., the display 230 of FIG. 2) of the electronic device does not display an image on the screen. The communicator may allocate the second antenna element to the wireless power transmission operation to the second external device.

In operation 770, the communicator may perform the wireless communication with the first external device in the first frequency band through the first antenna element. For example, the communicator may perform the wireless communication with the first external device in a 5 GHz frequency band through the first antenna element.

In operation 775, the communicator may perform the wireless power transmission to the second external device through the second antenna element. For example, the communicator may transmit a signal for the wireless power transmission to the second external device in a 2.4 GHz frequency band through the second antenna element.

Figure 8:
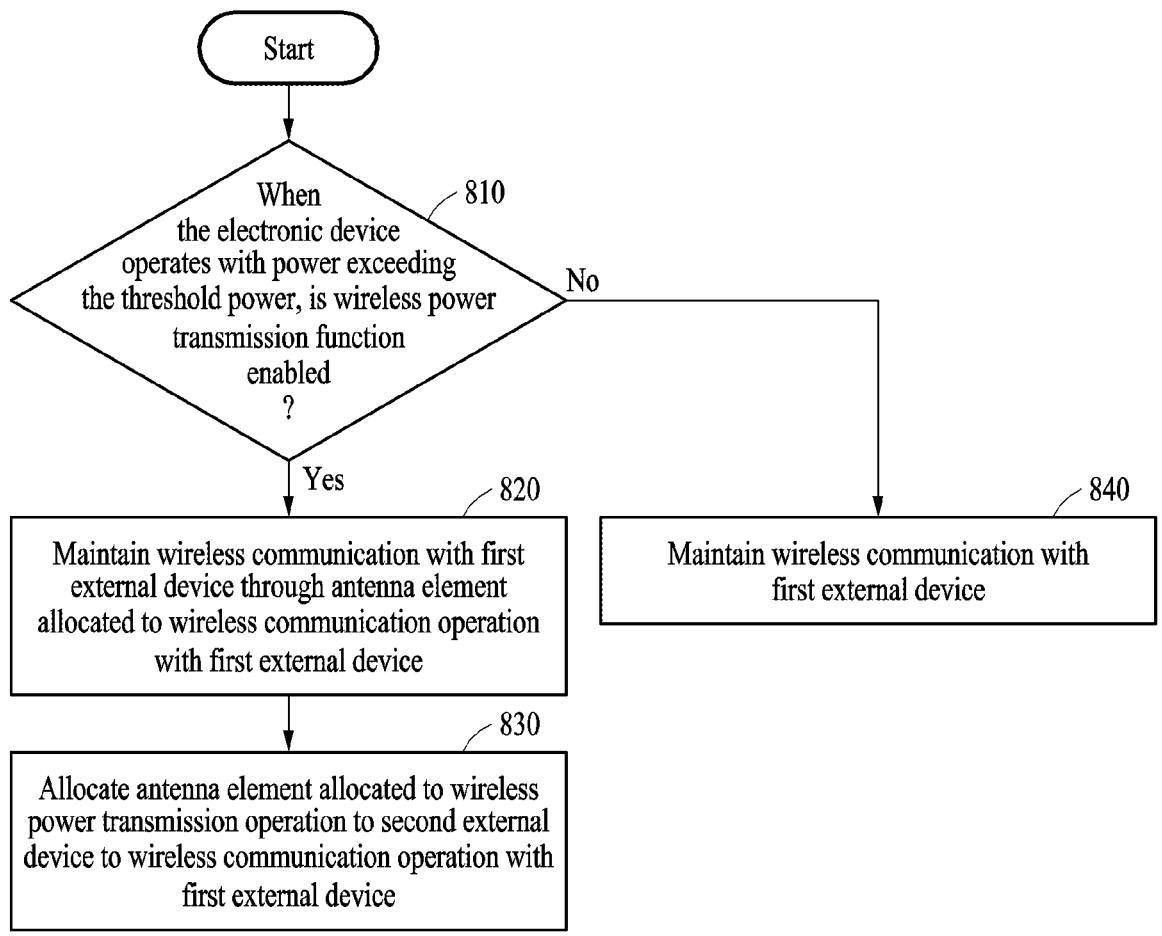
FIG. 8 is a flowchart illustrating an example method of operating an electronic device when operation power of the electronic device changes from power less than or equal to threshold power to power exceeding the threshold power according to various embodiments.
Figure 9A:
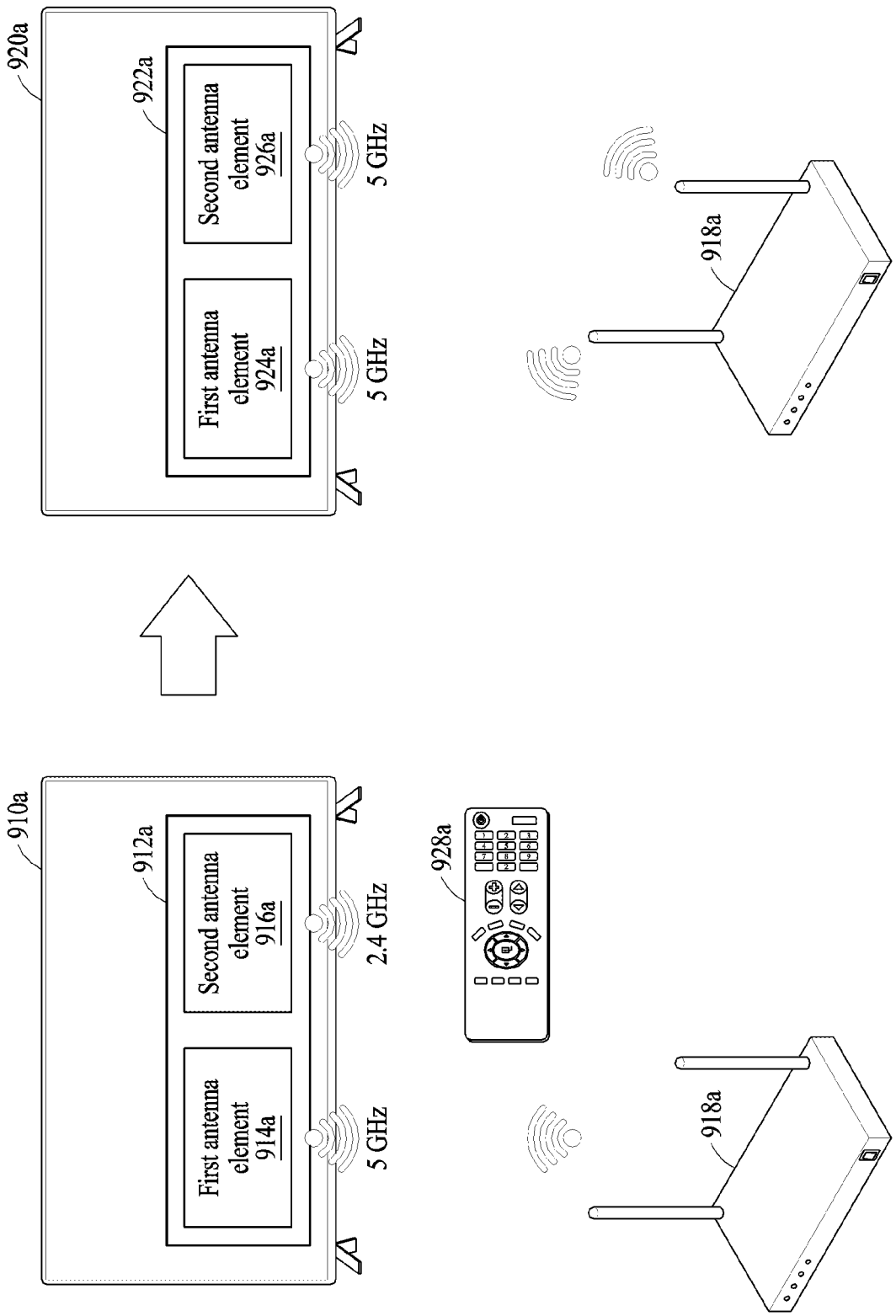
FIGS. 9A and 9B diagrams illustrating an example method of operating an electronic device according to an operation to which a plurality of antenna elements is allocated when operation power of the electronic device changes from power less than or equal to threshold power to power exceeding the threshold power according to various embodiments.
Figure 9B:
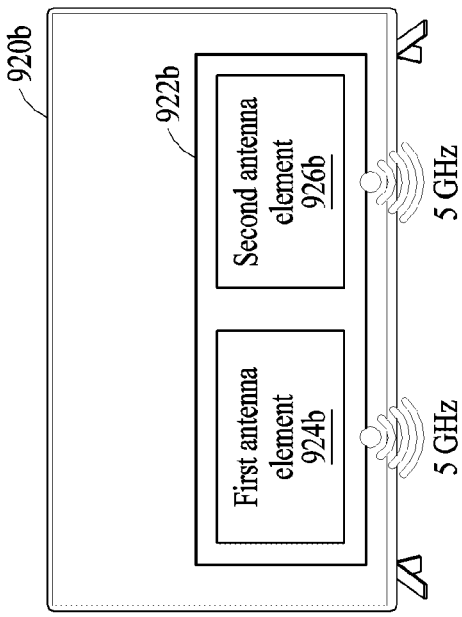
Figure 9B:
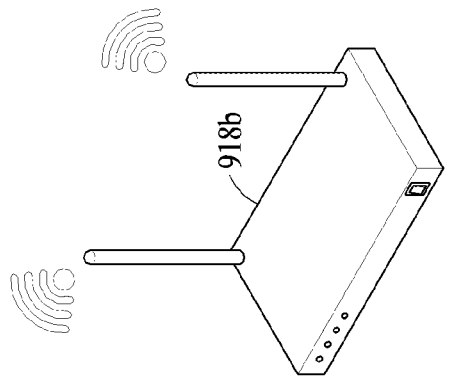
Figure 9B:
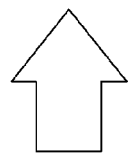
Figure 9B:
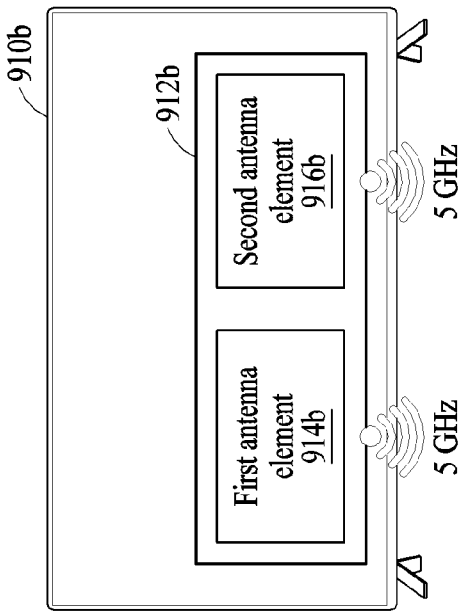
Figure 9B:
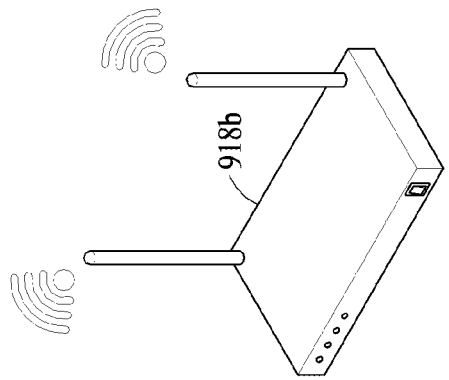

FIG. 8 is a flowchart illustrating an example method of operating an electronic device when operation power of the electronic device changes from power less than or equal to threshold power to power exceeding the threshold power according to various embodiments. FIGS. 9A and 9B are diagrams illustrating example operations of an electronic device according to an operation to which a plurality of antenna elements is allocated when operation power of the electronic device changes from power less than or equal to threshold power to power exceeding the threshold power according to various embodiments.

In operation 810, the processor may determine whether the wireless power transmission function is enabled when the electronic device operates with power exceeding the threshold power. For example, the processor may determine whether the wireless power transmission function is enabled when the operation power of the electronic device changes from power exceeding the threshold power to power less than or equal to the threshold power. As described above with reference to FIG. 3, the processor may determine whether the wireless power transmission function is enabled based on the wireless power transmission flag.

In operation 820, the processor may continuously allocate the antenna element allocated to the wireless communication with the first external device to the wireless communication with the first external device when the wireless power transmission function is enabled (YES in operation 810). The processor may maintain the wireless communication with the first external device through a portion (e.g., the first antenna element) of antenna elements allocated to the wireless communication with the first external device.

In operation 830, the processor may allocate another antenna element allocated to the wireless power transmission operation to the second external device to the wireless communication with the first external device when the wireless power transmission function is enabled. For example, the processor may change the operation using another antenna element (e.g., the second antenna element) among the plurality of antenna elements from the wireless power transmission operation to the second external device to the wireless communication operation with the first external device.

As described above, in operations 820 and 830, the processor may perform the wireless communication with the first external device when the wireless power transmission function is enabled. The processor may exclude the plurality of antenna elements from the allocation to the wireless power transmission operation to the second external device while the electronic device operates with power exceeding the threshold power.

In operation 840, the processor may maintain the wireless communication with the first external device through the plurality of antenna elements when the wireless power transmission function is disabled (NO in operation 810). The processor may exclude the plurality of antenna elements from the allocation to the wireless power transmission operation to the second external device.

Hereinafter, an operation of the electronic device in which the wireless power transmission function is enabled when the operation power of the electronic device changes from power less than or equal to the threshold power to power exceeding the threshold power is described in greater detail with reference to FIG. 9A.

As shown in FIG. 9A, the first antenna element 914a of the electronic device 910a may be allocated to the wireless communication operation with the first external device 918a and the second antenna element 916a may be allocated to the wireless power transmission operation to the second external device 928a while the electronic device 910a operates in power less than or equal to the threshold power. The electronic device 910a may perform the wireless communication with the first external device 918a and the wireless power transmission to the second external device 928a through the first antenna element 914a and the second antenna element 916a.

The processor may determine whether the wireless power transmission function is enabled when the electronic device 920a operates with power exceeding the threshold power. In FIG. 9A, the electronic device 920a may determine that the wireless power transmission function is enabled.

The processor may exclude the first antenna element 924a and the second antenna element 926a from the allocation to the wireless power transmission operation to the second external device when the wireless power transmission function is enabled. The processor may maintain the allocation of the first antenna element 924a to the wireless communication operation with the first external device 918a and may allocate the second antenna element 926a to the wireless communication with the first external device 918a. The processor may change the operation using the second antenna element 926a from the wireless power transmission operation to the second external device 928a to the wireless communication operation with the first external device 918a.

The electronic device 920a may perform wireless communication with the first external device 918a through the first antenna element 924a and the second antenna element 926a while the electronic device 920a operates with power exceeding the threshold power.

The processor may maintain the wireless communication with the first external device 918a through the first antenna element even if the operation power of the electronic device changes.

Hereinafter, an operation of an electronic device in which the wireless power transmission function is disabled when the operation power of the electronic device changes from power less than or equal to the threshold power to power exceeding the threshold power is described in greater detail with reference to FIG. 9B.

As shown in FIG. 9B, the first antenna element 914b and the second antenna element 916b of the electronic device 910b may be allocated to the wireless communication with the first external device 918b while the electronic device 910b operates with power less than or equal to the threshold power. The electronic device 910b may perform wireless communication with the first external device 918b through the first antenna element 914b and the second antenna element 916b.

The processor may determine whether the wireless power transmission function is enabled when the electronic device 920b operates with power exceeding the threshold power. In FIG. 9B, the electronic device 920b may determine that the wireless power transmission function is disabled.

The processor may maintain the wireless communication with the first external device 918b when the wireless power transmission function is disabled. The processor may maintain the allocation of the first and second antenna elements 924b and 926b to the wireless communication with the first external device 918b.

The electronic device 920b may perform the wireless communication with the first external device 918b through the first antenna element 924b and the second antenna element 926b while the electronic device 920b operates with power exceeding the threshold power.

The processor may maintain the wireless communication with the first external device 918b through the first antenna element and the second antenna element even if the operation power of the electronic device changes.

Figure 10:
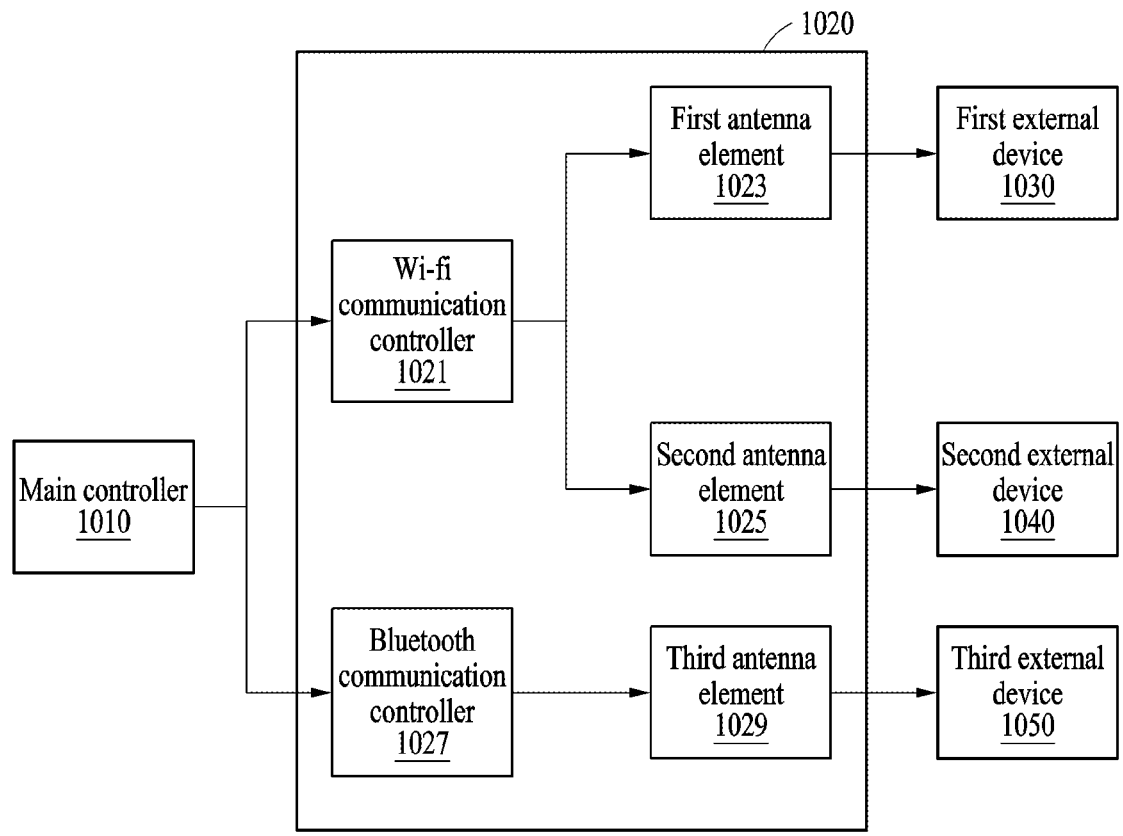
FIG. 10 is a block diagram illustrating an example configuration of a communicator of an electronic device, which performs wireless communication with a third external device according to various embodiments.
Figure 11:
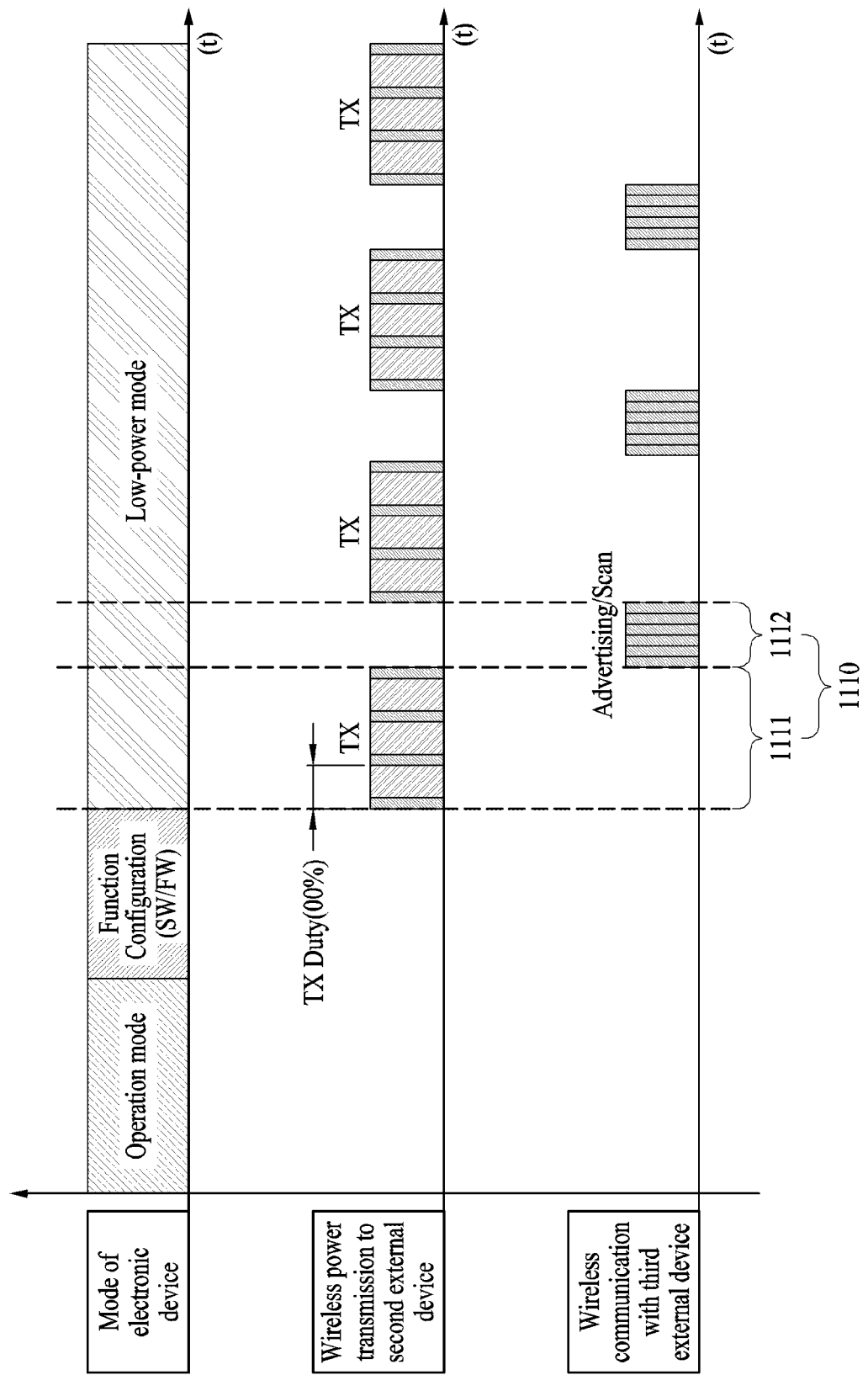
FIG. 11 is a diagram illustrating an example method of operating an electronic device performing wireless power transmission to a second external device and wireless communication with a third external device according to various embodiments.

FIG. 10 is a block diagram illustrating an example configuration of a communicator of an electronic device, which performs wireless communication with a third external device according to various embodiments. FIG. 11 is a diagram illustrating an example method of operating an electronic device performing wireless power transmission to a second external device and wireless communication with a third external device according to various embodiments.

A main controller (e.g., including processing circuitry) 1010 (e.g., the processor 210 of FIG. 2) of the electronic device (e.g., the electronic device 110 of FIG. 2) may control the operation of a communicator 1020 of the electronic device. For example, the main controller 1010 may control the electronic device to perform at least one of the wireless communication operation with a first external device 1030 and the wireless power transmission operation to a second external device 1040 through the communicator 1020.

The communicator 1020 may include a Wi-fi communication controller (e.g., including processing and/or control circuitry) 1021 and a plurality of antenna elements (e.g., a first antenna element 1023 and a second antenna element 1025 each including at least one antenna).

The Wi-Fi communication controller 1021 may include various processing and/or control circuitry and cooperate with the main controller 1010 to perform wireless communication and/or wireless power transmission. The Wi-Fi communication controller 1021 may set and operate the plurality of antenna elements for wireless communication and/or wireless power transmission.

The communicator 1020 may include the plurality of antenna elements. The communicator 1020 may include the first antenna element 1023 and the second antenna element 1025. As described above with reference to FIG. 3, the communicator 1020 may exclude the wireless power transmission to the second external device 1040 and perform communication with the first external device 1030, or perform communication with the first external device 1030 and wireless power transmission to the second external device 1040 at the same time through the plurality of antenna elements.

The communicator 1020 may perform the wireless communication with the first external device 1030 and the wireless power transmission to the second external device 1040 at the same time. The communicator 1020 may perform the wireless communication with the first external device 1030 and the wireless power transmission to the second external device 1040 at the same time in different frequency bands. For example, the communicator 1020 may perform the wireless communication with the first external device 1030 in the first frequency band through the first antenna element 1023. The communicator 1020 may perform the wireless power transmission to the second external device 1040 in the second frequency band that is different from the first frequency band through the second antenna element 1025.

Although FIG. 10 illustrates the communicator 1020 performing wireless communication with the first external device 1030 through the first antenna element 1023 and performing wireless power transmission to the second external device 1040 through the second antenna element 1025, the present disclosure is not limited thereto. The communicator 1020 may be connected to the first external device 1030 through both the first antenna element 1023 and the second antenna element 1025.

The communicator 1020 may exclude the wireless power transmission to the second external device 1040 and perform the wireless communication with the first external device 1030. For example, the communicator 1020 may perform the wireless communication with the first external device 1030 in the first frequency band through the first antenna element 1023 and the second antenna element 1025.

The communicator 1020 may further include a Bluetooth communication controller 1027 and the third antenna element 1029 with the Wi-fi communication controller 1021, the first antenna element 1023, and the second antenna element 1025. The Bluetooth communication controller 1027 may control the overall operation of the third antenna element 1029 under control by the main controller 1010.

The communicator 1020 may perform the wireless communication (e.g., Bluetooth communication) with a third external device 1050 in a third frequency band through the third antenna element 1029. The third frequency band may not overlap the first frequency band for the wireless communication with the first external device. At least a portion of the third frequency band may overlap the second frequency band for the wireless power transmission to the second external device. Here, the first frequency band may include a 5 GHz frequency band, the second frequency band may include a 2.4 GHz frequency band, and the third frequency band may include a 2.4 GHz frequency band.

The time division scheme may be used when the communicator 1020 performs the wireless power transmission to the second external device and the wireless communication with the third external device. For example, the communicator 1020 may perform the wireless power transmission operation to the second external device and the wireless communication operation with the third external device based on the time division scheme when at least a portion of the frequency band for the wireless power transmission operation to the second external device overlaps the wireless communication operation with the third external device.

The communicator 1020 may perform the wireless communication with the third external device 1050 and the wireless power transmission to the second external device 1040 by the time division method in the third frequency band. The communicator 1020 may perform one of the wireless power transmission operation to the second external device 1040 and the wireless communication operation with the third external device in a 2.4 GHz frequency band while maintaining the wireless communication with the first external device 1030 in a 5 GHz frequency band.

For example, as shown in FIG. 11, the main controller 1010 may maintain the wireless communication with the first external device 1030 in the 5 GHz frequency band through the first antenna element 1023 during the entire period of the communication period 1110. The main controller 1010 may perform the wireless power transmission to the second external device 1040 through the second antenna element 1025 during a portion 1111 of the communication period. The main controller 1010 may perform the wireless communication with the third external device 1050 in a 2.4 GHz frequency band through the third antenna element 1029 during another portion 1112 of the communication period.

The communicator 1020 may perform the wireless communication with the first external device 1030 and the wireless communication with the third external device 1050 when the main controller 1010 excludes the wireless power transmission to the second external device 1040 and performs the wireless communication with the first external device 1030. For example, the communicator 1020 may perform the wireless communication with the first external device 1030 in the first frequency band through the first antenna element 1023 and the second antenna element 1025 and may perform the wireless communication with the third external device 1050 in the third frequency band through the third antenna element 1029.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described embodiments, or vice versa.

As described above, although the embodiments have been described with reference to the drawings, one skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, while the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a plurality of antenna elements, each antenna element including at least one antenna, configured for at least one operation of a wireless communication operation with a first external device and a wireless power transmission operation to a second external device;
   at least one processor comprising processing circuitry; and
   a memory storing instructions that, when executed individually or collectively by the at least one processor, cause the electronic device to:
     determine whether a wireless power transmission function to the second external device is enabled based on the electronic device operating with power less than or equal to a threshold power; and
     maintain wireless communication with the first external device through the plurality of antenna elements and transmit a signal for wireless power transmission to the second external device based on the wireless power transmission function being enabled.

2. The electric device of claim 1, wherein the instructions when executed individually or collectively by the at least one processor, further cause the electronic device to:
   configure the plurality of antenna elements for a wireless communication operation with the first external device;
   based on the wireless power transmission function to the second external device being enabled, allocate at least one antenna element of the plurality of antenna elements for a wireless power transmission operation to a second external device; and
   based on the wireless power transmission function being enabled, maintain wireless communication with the first external device through at least one remaining antenna element of the plurality of antenna elements and transmit a signal for wireless power transmission to the second external device using the at least one antenna element.

3. The electronic device of claim 2, wherein the instructions when executed individually or collectively by the at least one processor, further cause the electronic device to:
   based on the wireless power transmission function being enabled, maintain wireless communication with the first external device through at least one remaining antenna element of the plurality of antenna elements in a first frequency band,
   and transmit a signal for wireless power transmission to the second external device using the at least one antenna element in a second frequency band different from the first frequency band.

4. The electronic device of claim 1, wherein the instructions when executed individually or collectively by the at least one processor, further cause the electronic device to:
   based on the wireless power transmission function being disabled, maintain the wireless communication with the first external device through the plurality of antenna elements based on the wireless power transmission function being disabled.

5. The electronic device of claim 1, wherein the instructions when executed individually or collectively by the at least one processor, further cause the electronic device to:
   based on the electronic device operating with power greater than the threshold power, exclude the plurality of antenna elements from an allocation to the wireless power transmission operation to the second external device based on the electronic device operating with power greater than the threshold power.

6. The electronic device of claim 5, wherein the instructions when executed individually or collectively by the at least one processor, further cause the electronic device to:
based on the electronic device operating with power greater than the threshold power, maintain the wireless communication with the first external device through at least a portion of the plurality of antenna elements, independently from whether the wireless power transmission function is enabled.

7. The electronic device of claim 5, wherein the instructions when executed individually or collectively by the at least one processor, further cause the electronic device to:
based on the electronic device operating with power greater than the threshold power and the wireless power transmission function being enabled, maintain the wireless communication with the first external device through an antenna element allocated to the wireless communication operation with the first external device among the plurality antenna elements based on the wireless power transmission function being enabled; and
based on the electronic device operating with power greater than the threshold power, allocate an antenna element allocated to the wireless power transmission operation to the second external device to the wireless communication operation with the first external device.

8. The electronic device of claim 1, wherein the instructions when executed individually or collectively by the at least one processor, further cause the electronic device to:
store, as enabled, a wireless power transmission flag indicating whether the wireless power transmission function to the second external device is enabled based on an input to enable the wireless power transmission function being received;
store, as disabled, the wireless power transmission flag as disabled based on an input to disable the wireless power transmission function being received; and
determine whether the wireless power transmission function to the second external device is enabled based on the stored wireless power transmission flag.

9. The electronic device of claim 1, further comprising:
an additional antenna element including at least one antenna configured for wireless communication operation with a third external device, and
wherein the instructions when executed individually or collectively by the at least one processor, further cause the electronic device to:
perform wireless communication with the third external device through the additional antenna element.

10. The electronic device of claim 9, wherein the instructions when executed individually or collectively by the at least one processor, further cause the electronic device to:
perform the wireless power transmission operation to the second external device and the wireless communication operation with the third external device through a time division scheme based on at least a portion of a frequency band for the wireless power transmission operation to the second external device overlapping a frequency band for the wireless communication operation with the third external device.

11. A method of operating an electronic device, the method comprising:
determining whether a wireless power transmission function to a second external device is enabled based on the electronic device operating with power less than or equal to a threshold power; and
maintaining wireless communication with a first external device through a plurality of antenna elements and transmitting a signal for wireless power transmission to the second external device based on the wireless power transmission function being enabled.

12. The method of claim 11, further comprising:
configuring the plurality of antenna elements for a wireless communication operation with the first external device; and
wherein the maintaining of the wireless communication with the first external device through the plurality of antenna elements and the transmitting of the signal for the wireless power transmission to the second external device comprises:
based on the wireless power transmission function to the second external device being enabled, allocating at least one antenna element of the plurality of antenna elements for a wireless power transmission operation to the second external device; and
based on the wireless power transmission function being enabled, maintaining wireless communication with the first external device through at least one remaining antenna element of the plurality of antenna elements and transmitting a signal for wireless power transmission to the second external device using the at least one antenna element.

13. The method of claim 12, wherein the maintaining of the wireless communication with the first external device through the plurality of antenna elements and the transmitting of the signal for the wireless power transmission to the second external device comprises:
based on the wireless power transmission function being enabled, maintaining wireless communication with the first external device through at least one remaining antenna element of the plurality of antenna elements in a first frequency band, and transmitting a signal for wireless power transmission to the second external device using the at least one antenna element in a second frequency band different from the first frequency band.

14. The method of claim 11, further comprising:
based on the wireless power transmission function being disabled, maintaining the wireless communication with the first external device through the plurality of antenna elements based on the wireless power transmission function being disabled.

15. The method of claim 11, further comprising:
based on the electronic device operating with power greater than the threshold power, excluding the plurality of antenna elements from an allocation to the wireless power transmission operation to the second external device based on the electronic device operating with power greater than the threshold power.

16. The method of claim 15, wherein the excluding of the plurality of antenna elements from the allocation to the wireless power transmission operation comprises based on the electronic device operating with power greater than the threshold power, maintaining the wireless communication with the first external device through at least a portion of the plurality of antenna elements, independently from whether the wireless power transmission function is enabled.

17. The method of claim 15, wherein the excluding of the plurality of antenna elements from the allocation to the wireless power transmission operation comprises:
based on the electronic device operating with power greater than the threshold power and the wireless power transmission function being enabled, maintaining the wireless communication with the first external device through an antenna element allocated to the wireless communication operation with the first external device among the plurality antenna elements based on the wireless power transmission function being enabled; and based on the electronic device operating with power greater than the threshold power, allocating an antenna element allocated to the wireless power transmission operation to the second external device to the wireless communication operation with the first external device.

18. The method of claim 11, further comprising:

storing, as enabled, a wireless power transmission flag indicating whether the wireless power transmission function to the second external device is enabled based on an input to enable the wireless power transmission function being received; and storing, as disabled, the wireless power transmission flag as disabled based on an input to disable the wireless power transmission function is received, wherein the determining of whether the wireless power transmission function to the second external device is enabled comprises determining whether the wireless power transmission function to the second external device is enabled based on the stored wireless power transmission flag.

19. A non-transitory computer-readable storage medium storing instructions that, when executed by a processor, cause the processor to perform the operations of claim 11.

20. The electronic device of claim 1, wherein whether the wireless power transmission function to the second external device is enabled is set based on user input.

* * * * *